US011132270B2

(12) United States Patent
AlQahtani et al.

(10) Patent No.: US 11,132,270 B2
(45) Date of Patent: Sep. 28, 2021

(54) PLANNED ZERO DOWNTIME SERVER SWITCHING FOR WEB APPLICATIONS

(71) Applicant: Saudi Arabian Oil Company, Dhahran (SA)

(72) Inventors: Yasser A. AlQahtani, Dammam (SA); Khaled A. AlHumaid, Dhahran (SA); Haidar A. AlDajani, Dammam (SA); Ammar R. Aleid, Qatif (SA); Torky Khalid Almohaisen, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 106 days.

(21) Appl. No.: 16/410,760

(22) Filed: May 13, 2019

(65) Prior Publication Data

US 2020/0364122 A1   Nov. 19, 2020

(51) Int. Cl.
*G06F 11/00* (2006.01)
*G06F 11/20* (2006.01)

(52) U.S. Cl.
CPC ...... *G06F 11/2023* (2013.01); *G06F 11/2025* (2013.01); *G06F 11/2094* (2013.01); *G06F 2201/80* (2013.01); *G06F 2201/805* (2013.01); *G06F 2201/85* (2013.01)

(58) Field of Classification Search
CPC ............. G06F 11/2023; G06F 11/2025; G06F 11/2028; G06F 11/2094; H04L 41/0668
See application file for complete search history.

(56) References Cited

U.S. PATENT DOCUMENTS

| 8,069,218 | B1 | 11/2011 | Tormasov et al. | |
|---|---|---|---|---|
| 8,234,471 | B2* | 7/2012 | Ito | G06F 11/2074 711/162 |
| 2001/0056554 | A1* | 12/2001 | Chrabaszcz | G06F 11/2023 714/13 |
| 2003/0177411 | A1* | 9/2003 | Dinker | G06F 11/2028 714/13 |
| 2003/0182427 | A1* | 9/2003 | Halpern | G06F 9/4862 709/226 |

(Continued)

OTHER PUBLICATIONS

PCT International Search Report and Written Opinion issued in International Application No. PCT/US2020/032600 dated Aug. 19, 2020, 15 pages.

*Primary Examiner* — Michael Maskulinski
(74) *Attorney, Agent, or Firm* — Fish & Richardson P.C.

(57) ABSTRACT

Systems and methods include a method for handling application requests. A request for an application is received at a zero downtime system. The application is accessible through: 1) primary application servers on a primary system coupled to a primary database, and 2) secondary application servers on a secondary system coupled to a secondary database synchronized to the primary database. A primary system status of the primary system is determined. When the primary system status is a healthy status, the request is routed to primary application servers of the primary system. When the primary system status is an unhealthy status, the request is routed to secondary application servers of the secondary system. When the primary system status is a scheduled system maintenance status, the request is routed to secondary application servers of the secondary system. The request is handled by the primary or the secondary application servers.

15 Claims, 5 Drawing Sheets

(56) References Cited

U.S. PATENT DOCUMENTS

| | | | |
|---|---|---|---|
| 2004/0133591 A1* | 7/2004 | Holenstein | G06F 11/2079 |
| 2007/0255977 A1 | 11/2007 | Liccione et al. | |
| 2008/0019316 A1* | 1/2008 | Imai | H04L 43/0811 |
| | | | 370/331 |
| 2013/0007505 A1* | 1/2013 | Spear | G06F 11/2025 |
| | | | 714/4.11 |
| 2014/0006846 A1* | 1/2014 | Wang | G06F 11/2025 |
| | | | 714/4.11 |
| 2018/0239677 A1 | 8/2018 | Chen et al. | |
| 2018/0322184 A1* | 11/2018 | Voss | G06F 16/278 |
| 2018/0341562 A1* | 11/2018 | Lu | G06F 11/2038 |
| 2019/0079841 A1 | 3/2019 | Lee et al. | |
| 2019/0340265 A1* | 11/2019 | Raman | H04L 67/1034 |

\* cited by examiner

PLANNED ZERO DOWNTIME SERVER SWITCHING FOR WEB APPLICATIONS

BACKGROUND

The present disclosure applies to providing applications for use by users. Web applications, for example, may be available through application (app) servers that provide access to the applications and underlying data. Systems that house the applications can sometimes experience problems that make the applications inaccessible. The problems can include, for example, hardware problems and database corruption.

SUMMARY

The present disclosure describes techniques that can be used for providing a planned zero planned downtime, a minimized outage time, and protection against database corruption for web applications. In some implementations, a computer-implemented method, includes: receiving, at a zero downtime system, a request for an application, the application accessible through: 1) one or more primary application servers on a primary system coupled to a primary database, and 2) one or more secondary application servers on a secondary system coupled to a secondary database synchronized to the primary database; determining, by the zero downtime system, a primary system status of the primary system; when the primary system status of the primary system is a healthy status, routing the request to the one or more primary application servers of the primary system; when the primary system status of the primary system is an unhealthy status, routing the request to one or more secondary application servers of the secondary system; when the primary system status of the primary system is a scheduled system maintenance status, routing the request to the one or more secondary application servers of the secondary system; and handling the request by the one or more primary application servers or the one or more secondary application servers, depending on the routing.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method, the instructions stored on the non-transitory, computer-readable medium.

The subject matter described in this specification can be implemented in particular implementations, so as to realize one or more of the following advantages. First, techniques can support an overall high availability setup by using a primary database and a secondary database. Second, long downtimes and unplanned outages for mission critical web applications can be avoided. Third, planned outages for web applications can occur without affecting users, as switching to the secondary system can be seamless. Fourth, the techniques can eliminate single points of failures (including hardware failures and data corruption) that can affect an entire system and prevent use of the system throughout the outage period. For example, a secondary system can be provided, including tools to support seamlessly resyncing data and switching users to a backup database.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

Figure 1:
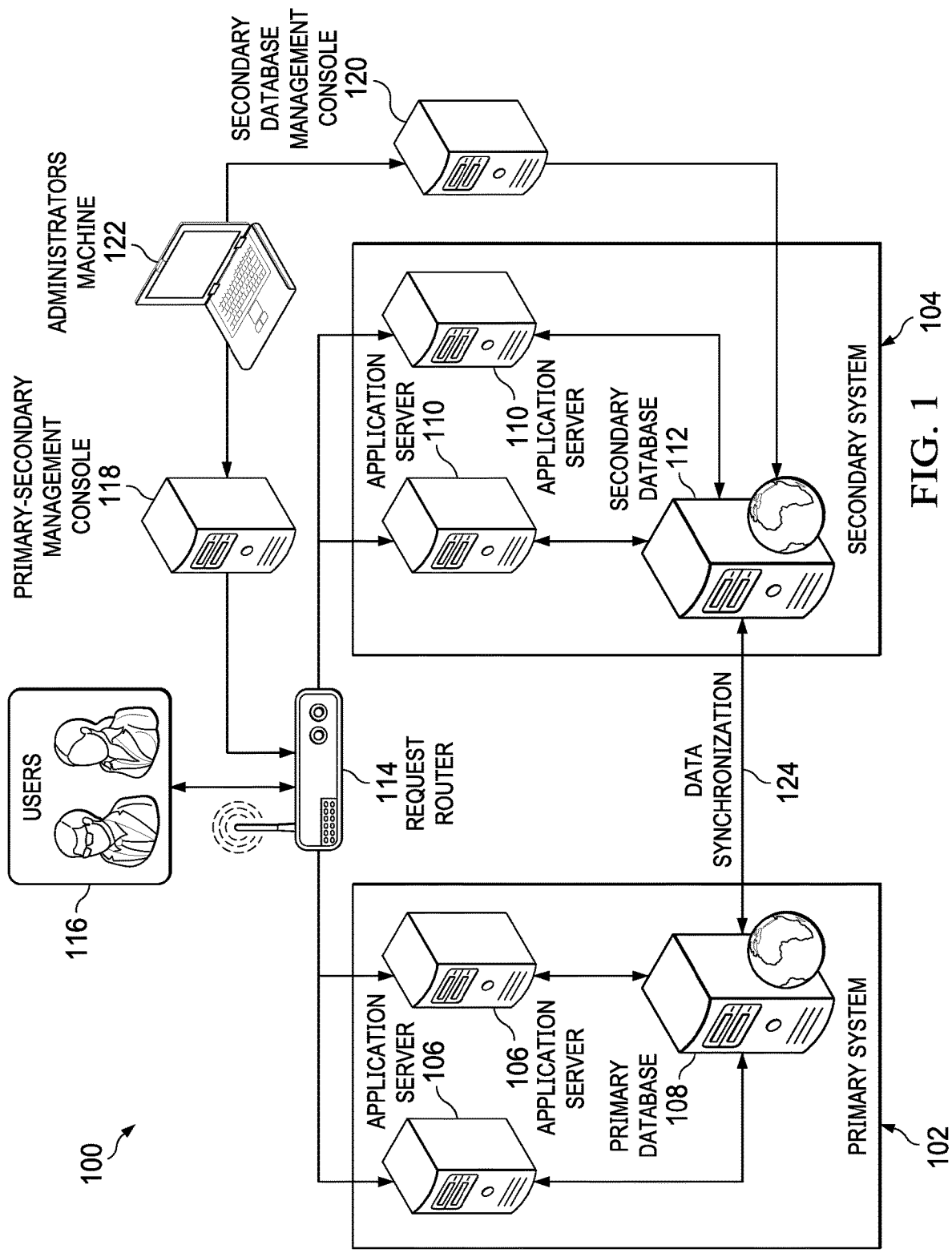
FIG. 1 is block diagram showing an example of a zero downtime system that provides zero downtime server switching for web applications, according to some implementations of the present disclosure.

The following detailed description describes techniques for providing a zero planned downtime, a minimized outage time, and protection against database corruption for web applications. A web application or a website can be said to have a "zero downtime" when, for example, service interruption does not occur or is limited to a short period of time (for example, a few seconds). Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

In some implementations, the techniques described in the present disclosure can include the use of tools for managing and switching between primary and backup systems and their corresponding databases. A switching (or request-routing) application can be used, for example, to control application server switching from a primary system (and primary database) to a secondary system (and secondary database). For example, the switching application can be implemented as a load balancing mechanism to control an application server farm and switching from the primary system to the secondary system. A primary-secondary management console, for example operating as load balancing console, can provide an application that is used, for example, by an administrator to instruct a request router to begin routing traffic to the secondary system. A rebuilding application can be used, for example, to automatically rebuild the secondary database. A synching tool can be used, for example, to synchronize (synch) primary and secondary databases. Database synchronization of a secondary database can provide a failover mechanism to reduce unplanned downtime. The database synchronization can rely on the implementation of secondary instances in addition to the secondary database, for example, where the secondary instances are permanently connected to the secondary database. The secondary instances can be configured, for example, in a portal using a HyperText Transfer Protocol (HTTP) and a virtual Internet protocol (IP) address (VIP) in a disabled status. In this type of configuration, secondary instances can be enabled within seconds. A secondary management console can provide a secondary database administration tool, for example, for managing the secondary database. Changes can be made to post activation activities to avoid manual configuration requirements such as uploading licenses, for example, when switching back and forth between the primary and secondary systems.

FIG. 1 is block diagram showing an example of a zero downtime system 100 that provides zero downtime server switching for web applications, according to some implementations of the present disclosure. The zero downtime system 100 includes a primary system 102 and a secondary system 104. The primary system 102 can provide a web application, for example, or an application that not web-based. The secondary system 104 that is different from primary system 102 can be in a different location, for example, in order to prevent single-point-of-failure situations. The primary system 102 and the secondary system 104 can be used for one or more applications.

The primary system 102 includes one or more application (app) servers 106 providing a software framework that can facilitate the execution of applications, including, for example, web applications. The primary system 102 also includes a primary database 108, which can be any type of database acting as the primary database for the primary system 102.

The secondary system 104 includes one or more application servers 110 providing a software framework that can facilitate the execution of web applications on the backup system 104, serving as a backup for the primary system 102. The secondary system 104 also includes a secondary database 112 that is continuously running and available as needed. In some implementations, either or both of the primary system 102 and the secondary system 104 can be distributed systems, with multiple servers and databases in different locations.

A request router 114 can be a device (or module) that routes application requests and traffic to different servers. For example, the request router 114 can operate as a switching manager that serves users 116 (for example, through their computer-implemented devices) and routes the traffic to either the primary system 102 or the secondary system 104. The request router 114 can reside on a system, a server, or on the Internet (for example, in an online storage repository such as the cloud). In some implementations, the request router 114 can be implemented using components of a load balancer.

The request router 114 can be controlled (including receiving inputs and commands from) a primary-secondary management console 118. Inputs and commands can be provided through one or more networks, including the Internet. The primary-secondary management console 118 can be, for example, an application that controls application traffic distribution to specific servers. In some implementations, the primary-secondary management console 118 can be implemented using components of a load balancing console. HTTP commands initiated through the primary-secondary management console 118 can be used to disable (or enable) the app server 106. Switching completely from the primary system to the secondary system can be done by disabling all primary system app servers and enabling all app servers of the secondary system. During normal operation, the enabling and disabling are reversed.

The users 116 are connected to the primary system 102, unless there is a problem with one or more components of the primary system 102. When a problem with the primary system 102 exists, the users 116 can be routed to the secondary system 104. Routing to the secondary system 104 can be triggered by commands sent to the request router 114 by the primary-secondary management console 118. This setup can provide zero downtime for planned system maintenance and downtime, and the system can minimize the unplanned system outages by immediately switching users to the secondary system.

A secondary database management console (SMC) 120 can serve as a tool used to control and automate tasks for maintaining and administering the secondary database 112. The SMC 120 can be an application, for example, that is accessible on a private web page for use by administrators, such as on an administrators machine 122. The SMC 120 can automate data synchronization 124 between the primary database 108 and the secondary database 112. The synchronization can include rebuilding the secondary database 112 after changes have occurred in the primary system 102. In this case, the secondary system 104 can be resynched and refreshed using the SMC 120. The SMC 120 can be included in, or be separate from, the secondary system 104.

Figure 2:
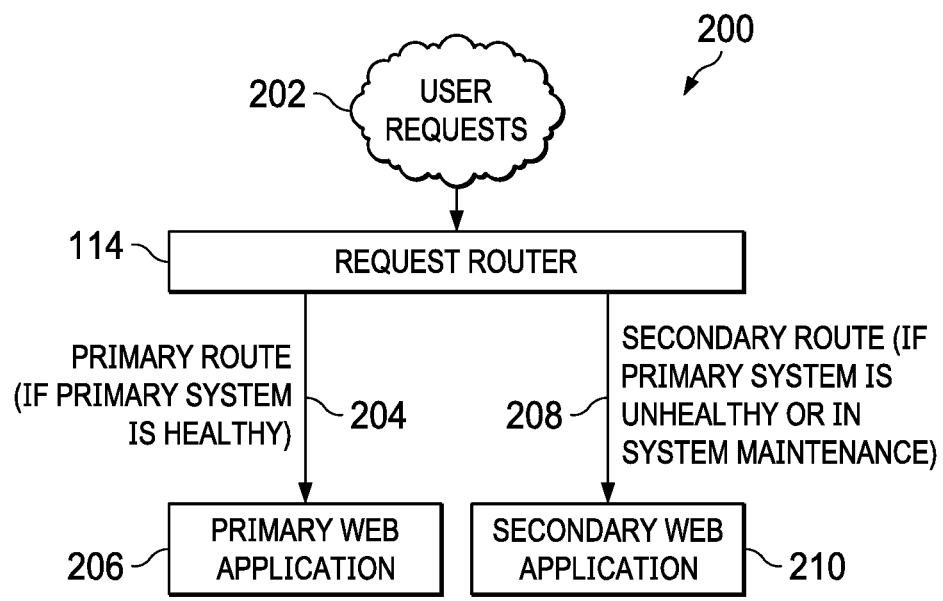
FIG. 2 is a block diagram showing an example of a request routing system for switching between primary and secondary systems, according to some implementations of the present disclosure.

FIG. 2 is a block diagram showing an example of a request routing system 200 for switching between primary and secondary systems, according to some implementations of the present disclosure. For example, events that occur in the system 200 can depend on different values of a primary system status that exist for the primary system.

In a first example of a primary system status, the primary system 102 and its components are healthy, indicating, for example, that no hardware errors exist and the database is not corrupted. In this example of a healthy status, the secondary system 104 remains as a secondary mode. As such, when user requests 202 are received, the request router 114 can implement a primary route 204, connecting the users to a primary web application 206.

In a second example of a primary system status, one or more of the primary system components may not be working, indicating an unhealthy status. This unhealthy status can exist, for example, when the primary database 108 or primary application server (including the app servers 106) are failing. Failures can exist for various technical reasons, such as data corruption or hardware malfunction. In this example of an unhealthy status, the request router 114 can implement a secondary route 208 to a secondary system 104, connecting the user to a secondary web application 210. The primary-secondary management console 118, for example, can inform the request router 114 of the unhealthy status, triggering the request router 114 to begin re-routing requests to the secondary system 104.

In a third example of a primary system status, scheduled system maintenance on the primary system 102 may be in progress, which can be indicated using a scheduled system maintenance status. In this example of a scheduled system maintenance status, the secondary route 208 can be used to route user requests to the secondary system 104 (for example, after being triggered by the primary-secondary management console 118). After scheduled system maintenance is complete, any changes in the primary database 108 can be used to rebuild the secondary database 112, such as by executing synchronization functions of the SMC 120.

Over time, the SMC 120 can provide an up-to-date status of the secondary system 104 and secondary database 112. The primary database 108 can be rebuilt using the secondary database 112 when the primary database 108 is unrecoverable using backup techniques. If a primary database 108 corruption occurs, a first recovery option can be from database backup. If backups cannot be used, then the secondary database 112 can be used.

Figure 3:
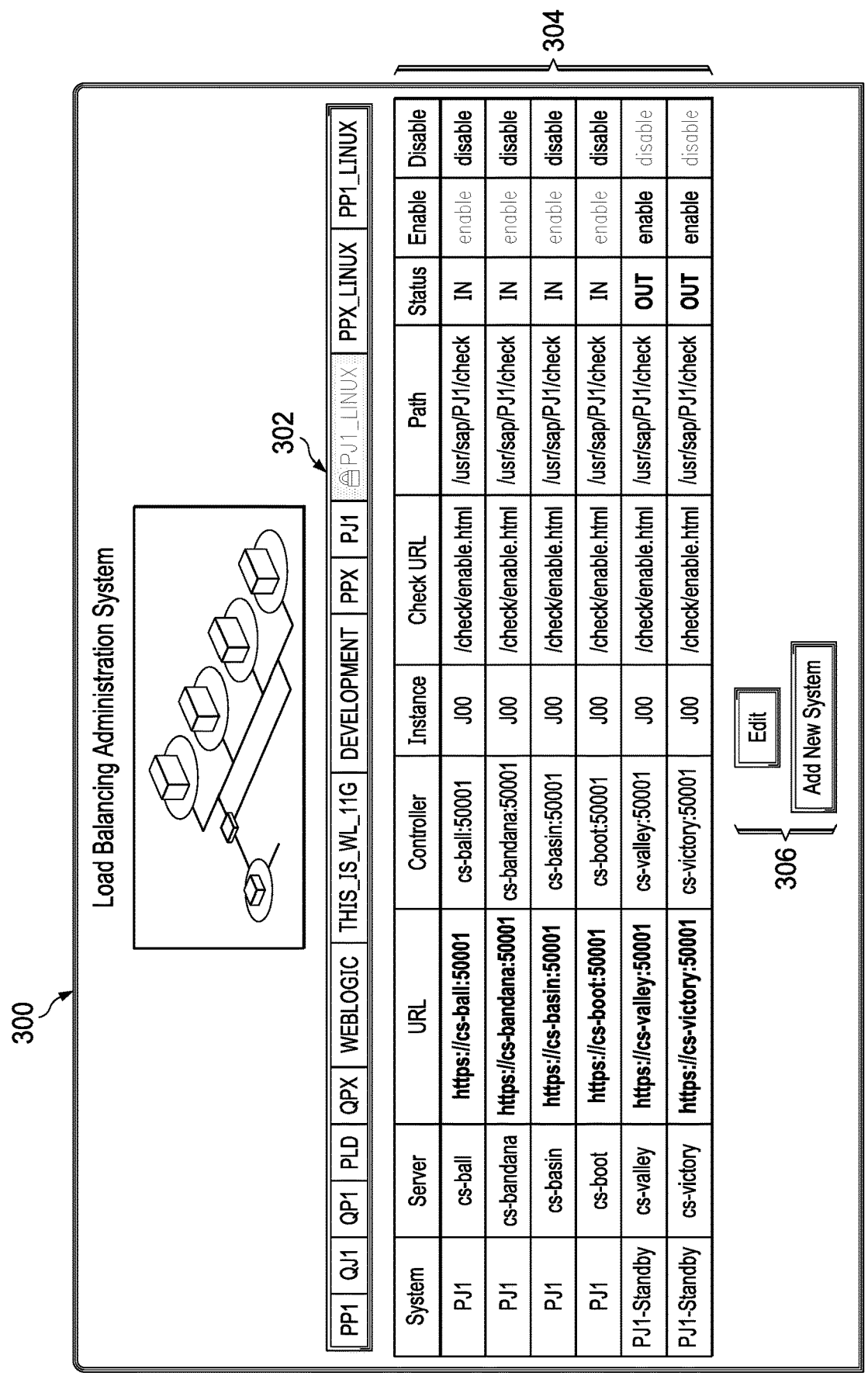
FIG. 3 is a screenshot of an example of a load balancing administration system, according to some implementations of the present disclosure.

FIG. 3 is a screenshot of an example of a load balancing administration system 300, according to some implementations of the present disclosure. An administrator, for example, can use the load balancing administration system 300 to balance loads on selected networks 302. System information 304 is displayed for the selected network 302. Options 306 can be used by the administrator, for example, to edit a particular system or add a new system.

Figure 4:
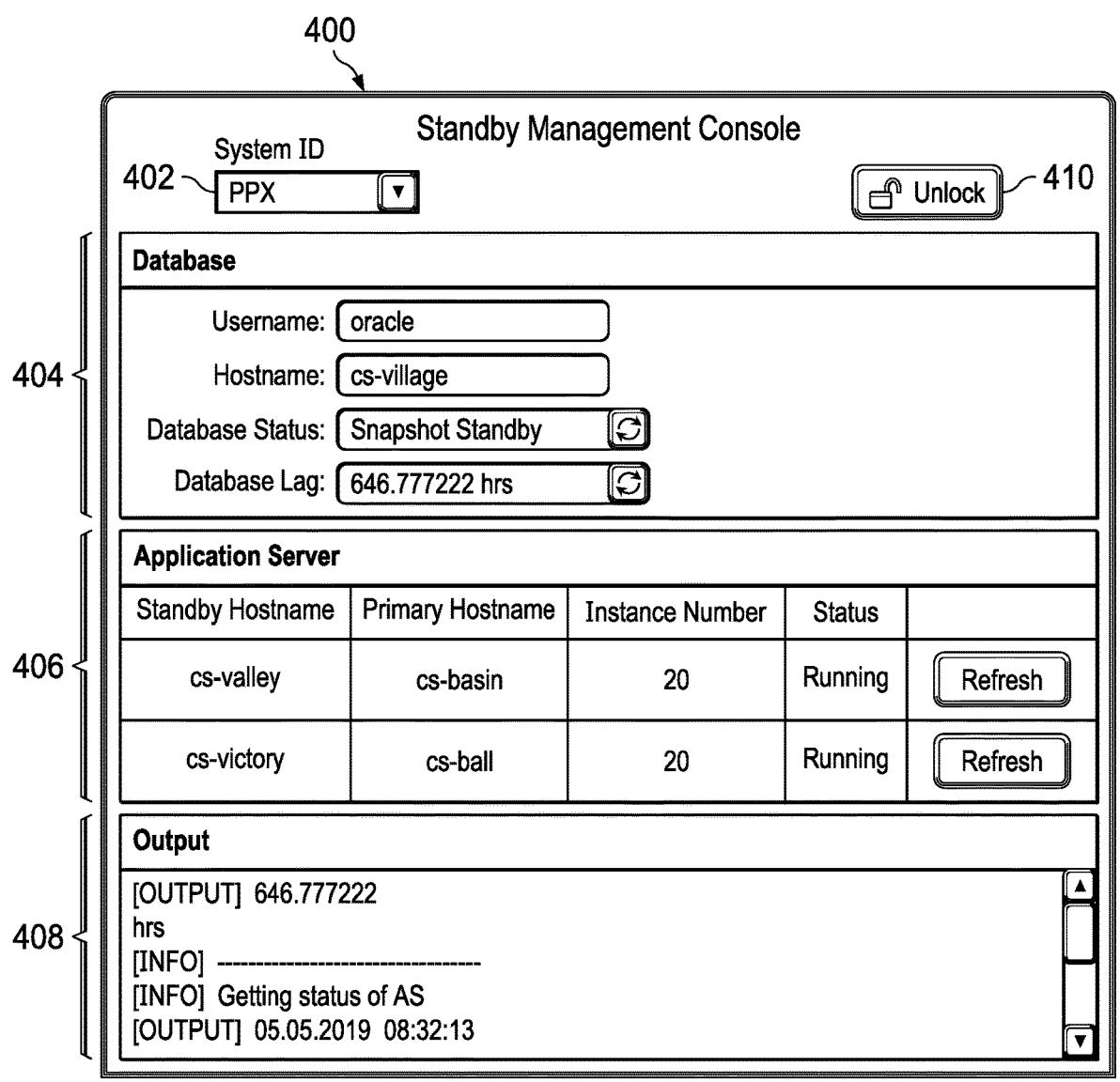
FIG. 4 is a screenshot of an example of a standby management console, according to some implementations of the present disclosure.

FIG. 4 is a screenshot of an example of a standby management console 400, according to some implementations of the present disclosure. The standby management console 400 can be used, for example, to unlock a particular system 402. For a given system, database information 404, application server information 406, and console output 408 is displayed. An unlock control 410 can be used to unlock the system 402.

Figure 5:
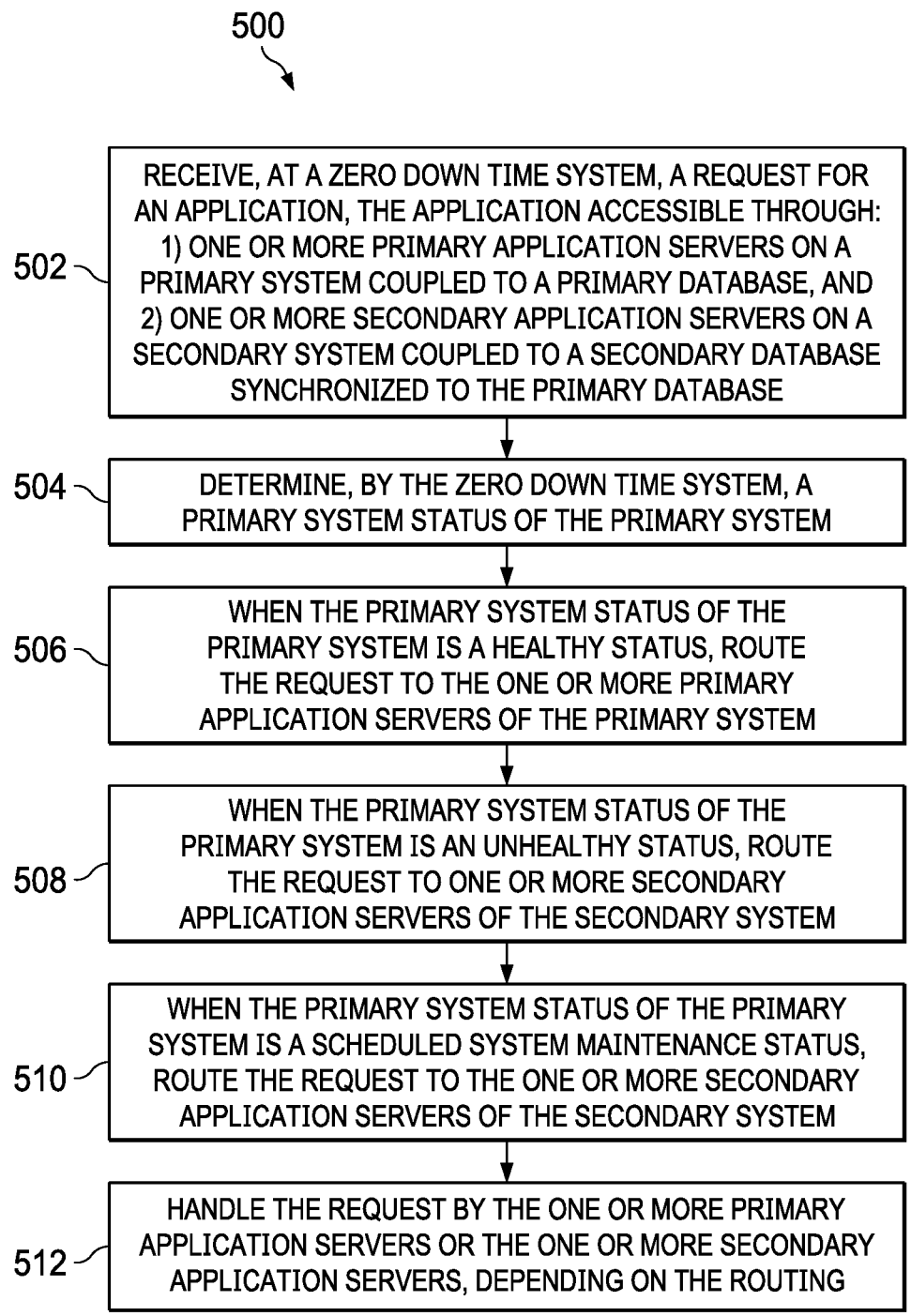
FIG. 5 is a flowchart of an example method for routing requests for a web application to primary application servers or secondary application servers in a zero planned downtime system, according to some implementations of the present disclosure.

FIG. 5 is a flowchart of an example method 500 for routing requests for a web application to primary application servers or secondary application servers in a zero planned downtime system, according to some implementations of the present disclosure. For clarity of presentation, the description that follows generally describes method 500 in the context of the other figures in this description. However, it will be understood that method 500 can be performed, for example, by any suitable system, environment, software, and hardware, or a combination of systems, environments, software, and hardware, as appropriate. In some implementations, various steps of method 500 can be run in parallel, in combination, in loops, or in any order.

At 502, a request for an application is received at a zero downtime system. The application is accessible through: 1) one or more primary application servers on a primary system coupled to a primary database, and 2) one or more secondary application servers on a secondary system coupled to a secondary database synchronized to the primary database. As an example, a request for a web application can be received by the zero downtime system 100 and handled by request router 114. The request can be from a user 116 for a web application that resides on both the primary system 102 and the secondary system 104. For example, the secondary database 112 can be synched to the primary database 108. In some implementations, the secondary database can be implemented using secondary instances. From 502, method 500 proceeds to 504.

At 504, a primary system status of the primary system is determined by the zero downtime system. For example, the administrator can determine the health of the primary system and decide whether the request should be routed to the secondary system, or the primary-secondary management console 118 can query the primary system 102 for the current status. In some implementations, if an error is returned in response to the query, indicating that a problem exists at the primary system 102, the primary-secondary management console 118 can begin a process of switching (or re-routing) requests to the secondary system 104.

In some implementations, determining the primary system status of the primary system can include determining an unhealthy status of the primary system and providing information to other components of the zero downtime system. For example, a primary-secondary managing console of the zero downtime system can determining that the primary system status of the primary system is in the unhealthy status when failures are detected on the primary system. For example, failures can include data corruption on the primary system 102 or a hardware failure on the primary system 102. After the unhealthy status has been determined, the primary-secondary management console 118 can provide a command to the request router 114 indicating that the primary system status of the primary system 102 is in the unhealthy status. From 504, method 500 proceeds to 506.

At 506, when the primary system status of the primary system is a healthy status, the request is routed to the one or more primary application servers of the primary system. For example, when an administrator knows that the primary system 102 is healthy, the primary-secondary management console 118 can publish (or make available) the healthy status. From 506, method 500 proceeds to 508.

At 508, when the primary system status of the primary system is an unhealthy status, the request is routed to one or more secondary application servers of the secondary system. As an example, when primary-secondary management console 118 knows or discovers that the primary system 102 is unhealthy (for example, because of data corruption or a hardware failure on the primary system), the primary-secondary management console 118 can publish (or make available) the unhealthy status. The administrator, for example, can determine if the users are routed to the primary or the secondary system. From 508, method 500 proceeds to 510.

At 510, when the primary system status of the primary system is a scheduled system maintenance status, the request is routed to the one or more secondary application servers of the secondary system. As an example, when primary-secondary management console 118 knows that the primary system 102 undergoing schedule system maintenance, the primary-secondary management console 118 can publish (or make available) the scheduled system maintenance status.

In some implementations, routing the request to the one or more primary application servers of the primary system or the one or more secondary application servers of the secondary system includes routing the request, by a request router, to one of the primary system or the secondary system based on a current status. For example, depending on the current status of the primary system 102, the request router 114 can route requests from users 116 to either of the application servers 106 or the application servers 110. From 510, method 500 proceeds to 512.

At 512, the request is handled by the one or more primary application servers or the one or more secondary application servers, depending on the routing. For example, the application servers 106 or the application servers 110 can handle the request routed to them by the request router 114. After 512, method 500 can stop.

In some implementations, method 500 can further include a sequence of actions for performing a planned system maintenance on the primary system. For example, a command identifying a system maintenance time period for scheduled system maintenance of the primary system 102 can be received at the request router 114 from the primary-secondary management console 118. At a starting time of the system maintenance time period, the primary-secondary management console 118 can set the primary system status of the primary system 102 to the scheduled system maintenance status. Upon completion of the scheduled system maintenance of the primary system 102, the secondary database management console 120 can synchronizing the secondary database 112 and the primary database 108. Upon completion of the synchronization, the primary-secondary management console 118 can set the primary system status of the primary system 102 to the healthy status.

Figure 6:
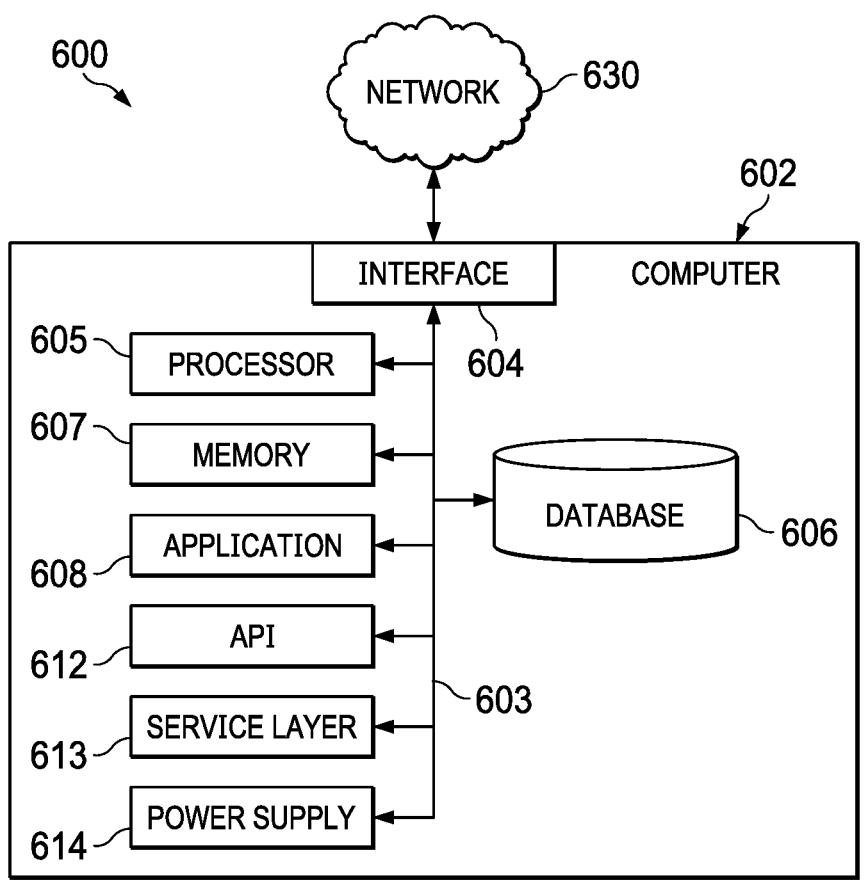
FIG. 6 is a block diagram illustrating an example computer system used to provide computational functionalities associated with described algorithms, methods, functions, processes, flows, and procedures as described in the present disclosure, according to some implementations of the present disclosure.

FIG. 6 is a block diagram of an example computer system 600 used to provide computational functionalities associated with described algorithms, methods, functions, processes, flows, and procedures described in the present disclosure, according to some implementations of the present disclosure. The illustrated computer 602 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 602 can include input devices such as keypads, keyboards, and touch screens that can accept user information. Also, the computer 602 can include output devices that can convey information associated with the operation of the computer 602. The information can include digital data, visual data, audio information, or a combination of information. The information can be presented in a graphical user interface (UI) (or GUI).

The computer 602 can serve in a role as a client, a network component, a server, a database, a persistency, or components of a computer system for performing the subject matter described in the present disclosure. The illustrated computer 602 is communicably coupled with a network 630. In some implementations, one or more components of the computer 602 can be configured to operate within different environments, including cloud-computing-based environments, local environments, global environments, and combinations of environments.

At a high level, the computer 602 is an electronic computing device operable to receive, transmit, process, store, and manage data and information associated with the described subject matter. According to some implementations, the computer 602 can also include, or be communicably coupled with, an application server, an email server, a web server, a caching server, a streaming data server, or a combination of servers.

The computer 602 can receive requests over network 630 from a client application (for example, executing on another computer 602). The computer 602 can respond to the received requests by processing the received requests using software applications. Requests can also be sent to the computer 602 from internal users (for example, from a command console), external (or third) parties, automated applications, entities, individuals, systems, and computers.

Each of the components of the computer 602 can communicate using a system bus 603. In some implementations, any or all of the components of the computer 602, including hardware or software components, can interface with each other or the interface 604 (or a combination of both), over the system bus 603. Interfaces can use an application programming interface (API) 612, a service layer 613, or a combination of the API 612 and service layer 613. The API 612 can include specifications for routines, data structures, and object classes. The API 612 can be either computer-language independent or dependent. The API 612 can refer to a complete interface, a single function, or a set of APIs.

The service layer 613 can provide software services to the computer 602 and other components (whether illustrated or not) that are communicably coupled to the computer 602. The functionality of the computer 602 can be accessible for all service consumers using this service layer. Software services, such as those provided by the service layer 613, can provide reusable, defined functionalities through a defined interface. For example, the interface can be software written in JAVA, C++, or a language providing data in extensible markup language (XML) format. While illustrated as an integrated component of the computer 602, in alternative implementations, the API 612 or the service layer 613 can be stand-alone components in relation to other components of the computer 602 and other components communicably coupled to the computer 602. Moreover, any or all parts of the API 612 or the service layer 613 can be implemented as child or sub-modules of another software module, enterprise application, or hardware module without departing from the scope of the present disclosure.

The computer 602 includes an interface 604. Although illustrated as a single interface 604 in FIG. 6, two or more interfaces 604 can be used according to particular needs, desires, or particular implementations of the computer 602 and the described functionality. The interface 604 can be used by the computer 602 for communicating with other systems that are connected to the network 630 (whether illustrated or not) in a distributed environment. Generally, the interface 604 can include, or be implemented using, logic encoded in software or hardware (or a combination of software and hardware) operable to communicate with the network 630. More specifically, the interface 604 can include software supporting one or more communication protocols associated with communications. As such, the network 630 or the interface's hardware can be operable to communicate physical signals within and outside of the illustrated computer 602.

The computer 602 includes a processor 605. Although illustrated as a single processor 605 in FIG. 6, two or more processors 605 can be used according to particular needs, desires, or particular implementations of the computer 602 and the described functionality. Generally, the processor 605 can execute instructions and can manipulate data to perform the operations of the computer 602, including operations using algorithms, methods, functions, processes, flows, and procedures as described in the present disclosure.

The computer 602 also includes a database 606 that can hold data for the computer 602 and other components connected to the network 630 (whether illustrated or not). For example, database 606 can be an in-memory, conventional, or a database storing data consistent with the present disclosure. In some implementations, database 606 can be a combination of two or more different database types (for example, hybrid in-memory and conventional databases) according to particular needs, desires, or particular implementations of the computer 602 and the described functionality. Although illustrated as a single database 606 in FIG. 6, two or more databases (of the same, different, or combination of types) can be used according to particular needs, desires, or particular implementations of the computer 602 and the described functionality. While database 606 is illustrated as an internal component of the computer 602, in alternative implementations, database 606 can be external to the computer 602.

The computer 602 also includes a memory 607 that can hold data for the computer 602 or a combination of components connected to the network 630 (whether illustrated or not). Memory 607 can store any data consistent with the present disclosure. In some implementations, memory 607 can be a combination of two or more different types of memory (for example, a combination of semiconductor and magnetic storage) according to particular needs, desires, or particular implementations of the computer 602 and the described functionality. Although illustrated as a single memory 607 in FIG. 6, two or more memories 607 (of the same, different, or combination of types) can be used according to particular needs, desires, or particular implementations of the computer 602 and the described functionality. While memory 607 is illustrated as an internal component of the computer 602, in alternative implementations, memory 607 can be external to the computer 602.

The application 608 can be an algorithmic software engine providing functionality according to particular needs, desires, or particular implementations of the computer 602 and the described functionality. For example, application 608 can serve as one or more components, modules, or applications. Further, although illustrated as a single application 608, the application 608 can be implemented as multiple applications 608 on the computer 602. In addition, although illustrated as internal to the computer 602, in alternative implementations, the application 608 can be external to the computer 602.

The computer 602 can also include a power supply 614. The power supply 614 can include a rechargeable or non-rechargeable battery that can be configured to be either user- or non-user-replaceable. In some implementations, the power supply 614 can include power-conversion and management circuits, including recharging, standby, and power management functionalities. In some implementations, the power-supply 614 can include a power plug to allow the computer 602 to be plugged into a wall socket or a power source to, for example, power the computer 602 or recharge a rechargeable battery.

There can be any number of computers 602 associated with, or external to, a computer system containing computer 602, with each computer 602 communicating over network 630. Further, the terms "client," "user," and other appropriate terminology can be used interchangeably, as appropriate, without departing from the scope of the present disclosure. Moreover, the present disclosure contemplates that many users can use one computer 602 and one user can use multiple computers 602.

Described implementations of the subject matter can include one or more features, alone or in combination.

For example, in a first implementation, a computer-implemented method, includes a method for handling application requests. A request for an application is received at a zero downtime system. The application is accessible through: 1) one or more primary application servers on a primary system coupled to a primary database, and 2) one or more secondary application servers on a secondary system coupled to a secondary database synchronized to the primary database. A primary system status of the primary system is determined by the zero downtime system. When the primary system status of the primary system is a healthy status, the request is routed to the one or more primary application servers of the primary system. When the primary system status of the primary system is an unhealthy status, the request is routed to one or more secondary application servers of the secondary system. When the primary system status of the primary system is a scheduled system maintenance status, the request is routed to the one or more secondary application servers of the secondary system. The request is handled by the one or more primary application servers or the one or more secondary application servers, depending on the routing.

The foregoing and other described implementations can each, optionally, include one or more of the following features:

A first feature, combinable with any of the following features, where routing the request to the one or more primary application servers of the primary system or the one or more secondary application servers of the secondary system includes routing the request, by a request router, to one of the primary system or the secondary system based on a current status.

A second feature, combinable with any of the previous or following features, where determining the primary system status of the primary system includes: determining, by a primary-secondary managing console of the zero downtime system, that the primary system status of the primary system is in the unhealthy status when failures are detected on the primary system; and providing, by the primary-secondary management console, a command to the request router indicating that the primary system status of the primary system is in the unhealthy status.

A third feature, combinable with any of the previous or following features, where the failures include one of data corruption on the primary system or a hardware failure on the primary system.

A fourth feature, combinable with any of the previous or following features, further including: receiving, at the request router from the primary-secondary management console, a command identifying a system maintenance time period for scheduled system maintenance of the primary system; setting, by the primary-secondary management console at a starting time of the system maintenance time period, the primary system status of the primary system to the scheduled system maintenance status; and upon completion of the scheduled system maintenance of the primary system: synchronizing, by a secondary database management console, the secondary database and the primary database; and setting, by the primary-secondary management console, the primary system status of the primary system to the healthy status.

A fifth feature, combinable with any of the previous or following features, where the secondary database is implemented using secondary instances.

A sixth feature, combinable with any of the previous or following features, where routing the request to the one or more secondary application servers of the secondary system is based on input from an administrator.

In a second implementation, a non-transitory, computer-readable medium storing one or more instructions executable by a computer system to perform operations including the following. A request for an application is received at a zero downtime system. The application is accessible through: 1) one or more primary application servers on a primary system coupled to a primary database, and 2) one or more secondary application servers on a secondary system coupled to a secondary database synchronized to the primary database. A primary system status of the primary system is determined by the zero downtime system. When the primary system status of the primary system is a healthy status, the request is routed to the one or more primary application servers of the primary system. When the primary system status of the primary system is an unhealthy status, the request is routed to one or more secondary application servers of the secondary system. When the primary system status of the primary system is a scheduled system maintenance status, the request is routed to the one or more secondary application servers of the secondary system. The request is handled by the one or more primary application servers or the one or more secondary application servers, depending on the routing.

The foregoing and other described implementations can each, optionally, include one or more of the following features:

A first feature, combinable with any of the following features, where routing the request to the one or more primary application servers of the primary system or the one or more secondary application servers of the secondary system includes routing the request, by a request router, to one of the primary system or the secondary system based on a current status.

A second feature, combinable with any of the previous or following features, where determining the primary system status of the primary system includes: determining, by a primary-secondary managing console of the zero downtime system, that the primary system status of the primary system is in the unhealthy status when failures are detected on the primary system; and providing, by the primary-secondary management console, a command to the request router indicating that the primary system status of the primary system is in the unhealthy status.

A third feature, combinable with any of the previous or following features, where the failures include one of data corruption on the primary system or a hardware failure on the primary system.

A fourth feature, combinable with any of the previous or following features, the operations further including: receiving, at the request router from the primary-secondary management console, a command identifying a system maintenance time period for scheduled system maintenance of the primary system; setting, by the primary-secondary management console at a starting time of the system maintenance time period, the primary system status of the primary system to the scheduled system maintenance status; and upon completion of the scheduled system maintenance of the primary system: synchronizing, by a secondary database management console, the secondary database and the primary database; and setting, by the primary-secondary management console, the primary system status of the primary system to the healthy status.

A fifth feature, combinable with any of the previous or following features, where the secondary database is implemented using secondary instances.

A sixth feature, combinable with any of the previous or following features, where routing the request to the one or more secondary application servers of the secondary system is based on input from an administrator.

In a third implementation, a computer-implemented system, including one or more processors and a non-transitory computer-readable storage medium coupled to the one or more processors and storing programming instructions for execution by the one or more processors, the programming instructions instructing the one or more processors to perform operations including the following. A request for an application is received at a zero downtime system. The application is accessible through: 1) one or more primary application servers on a primary system coupled to a primary database, and 2) one or more secondary application servers on a secondary system coupled to a secondary database synchronized to the primary database. A primary system status of the primary system is determined by the zero downtime system. When the primary system status of the primary system is a healthy status, the request is routed to the one or more primary application servers of the primary system. When the primary system status of the primary system is an unhealthy status, the request is routed to one or more secondary application servers of the secondary system. When the primary system status of the primary system is a scheduled system maintenance status, the request is routed to the one or more secondary application servers of the secondary system. The request is handled by the one or more primary application servers or the one or more secondary application servers, depending on the routing.

The foregoing and other described implementations can each, optionally, include one or more of the following features:

A first feature, combinable with any of the following features, where routing the request to the one or more primary application servers of the primary system or the one or more secondary application servers of the secondary system includes routing the request, by a request router, to one of the primary system or the secondary system based on a current status.

A second feature, combinable with any of the previous or following features, where determining the primary system status of the primary system includes: determining, by a primary-secondary managing console of the zero downtime system, that the primary system status of the primary system is in the unhealthy status when failures are detected on the primary system; and providing, by the primary-secondary management console, a command to the request router indicating that the primary system status of the primary system is in the unhealthy status.

A third feature, combinable with any of the previous or following features, where the failures include one of data corruption on the primary system or a hardware failure on the primary system.

A fourth feature, combinable with any of the previous or following features, the operations further including: receiving, at the request router from the primary-secondary management console, a command identifying a system maintenance time period for scheduled system maintenance of the primary system; setting, by the primary-secondary management console at a starting time of the system maintenance time period, the primary system status of the primary system to the scheduled system maintenance status; and upon completion of the scheduled system maintenance of the primary system: synchronizing, by a secondary database management console, the secondary database and the primary database; and setting, by the primary-secondary management console, the primary system status of the primary system to the healthy status.

A fifth feature, combinable with any of the previous or following features, where the secondary database is implemented using secondary instances.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:
1. A computer-implemented method, comprising:
  receiving, at a zero downtime system, a request for an application, the application accessible through: 1) one or more primary application servers on a primary system coupled to a primary database, and 2) one or more secondary application servers on a secondary system coupled to a secondary database synchronized to the primary database;
  determining, by the zero downtime system, a primary system status of the primary system;
  when the primary system status of the primary system is a healthy status, routing the request to the one or more primary application servers of the primary system;
  when the primary system status of the primary system is an unhealthy status:
    informing, by an application of a primary-secondary managing console, a request router that the primary system status of the primary system is the unhealthy status;
    triggering, by an application of the primary-secondary managing console operating as a load balancing console and in response to the informing, the request router to begin routing traffic to the secondary system; and routing, by the request router, the request to one or more secondary application servers of the secondary system;

when the primary system status of the primary system is a scheduled system maintenance status:

receiving, from the application of the primary-secondary managing console operating as the load balancing console, an instruction initiated by an administrator instructing the request router to begin routing traffic to the secondary system;

performing the scheduled system maintenance of the primary system, including using secondary instances in addition to the secondary database, wherein the secondary instances are permanently connected to the secondary database;

upon completion of the scheduled system maintenance of the primary system:

synchronizing, by a secondary database managing console, the secondary database, the primary database, and the secondary instances; and setting, by the primary-secondary managing console, the primary system status of the primary system to the healthy status; and routing the request to the one or more secondary application servers of the secondary system; and handling the request by the one or more primary application servers or the one or more secondary application servers, depending on the routing.

2. The computer-implemented method of claim 1, wherein routing the request to the one or more primary application servers of the primary system or the one or more secondary application servers of the secondary system includes routing the request, by the request router, to one of the primary system or the secondary system based on a current status.

3. The computer-implemented method of claim 2, wherein determining the primary system status of the primary system comprises:

determining, by the primary-secondary managing console of the zero downtime system, that the primary system status of the primary system is in the unhealthy status when failures are detected on the primary system; and providing, by the primary-secondary managing console, a command to the request router indicating that the primary system status of the primary system is in the unhealthy status.

4. The computer-implemented method of claim 3, wherein the failures include one of data corruption on the primary system or a hardware failure on the primary system.

5. The computer-implemented method of claim 3, further comprising:

receiving, at the request router from the primary-secondary managing console, a command identifying a system maintenance time period for scheduled system maintenance of the primary system; and setting, by the primary-secondary managing console at a starting time of the system maintenance time period, the primary system status of the primary system to the scheduled system maintenance status.

6. A non-transitory, computer-readable medium storing one or more instructions executable by a computer system to perform operations comprising:

receiving, at a zero downtime system, a request for an application, the application accessible through: 1) one or more primary application servers on a primary system coupled to a primary database, and 2) one or more secondary application servers on a secondary system coupled to a secondary database synchronized to the primary database;

determining, by the zero downtime system, a primary system status of the primary system;

when the primary system status of the primary system is a healthy status, routing the request to the one or more primary application servers of the primary system;

when the primary system status of the primary system is an unhealthy status:

informing, by an application of a primary-secondary managing console, a request router that the primary system status of the primary system is the unhealthy status;

triggering, by an application of the primary-secondary managing console operating as a load balancing console and in response to the informing, the request router to begin routing traffic to the secondary system; and routing, by the request router, the request to one or more secondary application servers of the secondary system;

when the primary system status of the primary system is a scheduled system maintenance status:

receiving, from the application of the primary-secondary managing console operating as the load balancing console, an instruction initiated by an administrator instructing the request router to begin routing traffic to the secondary system;

performing the scheduled system maintenance of the primary system, including using secondary instances in addition to the secondary database, wherein the secondary instances are permanently connected to the secondary database;

upon completion of the scheduled system maintenance of the primary system:

synchronizing, by a secondary database managing console, the secondary database, the primary database, and the secondary instances; and setting, by the primary-secondary managing console, the primary system status of the primary system to the healthy status; and routing the request to the one or more secondary application servers of the secondary system; and handling the request by the one or more primary application servers or the one or more secondary application servers, depending on the routing.

7. The non-transitory, computer-readable medium of claim 6, wherein routing the request to the one or more primary application servers of the primary system or the one or more secondary application servers of the secondary system includes routing the request, by the request router, to one of the primary system or the secondary system based on a current status.

8. The non-transitory, computer-readable medium of claim 7, wherein determining the primary system status of the primary system comprises:

determining, by the primary-secondary managing console of the zero downtime system, that the primary system status of the primary system is in the unhealthy status when failures are detected on the primary system; and providing, by the primary-secondary managing console, a command to the request router indicating that the primary system status of the primary system is in the unhealthy status.

9. The non-transitory, computer-readable medium of claim 8, wherein the failures include one of data corruption on the primary system or a hardware failure on the primary system.

10. The non-transitory, computer-readable medium of claim 8, the operations further comprising:
  receiving, at the request router from the primary-secondary managing console, a command identifying a system maintenance time period for scheduled system maintenance of the primary system; and
  setting, by the primary-secondary managing console at a starting time of the system maintenance time period, the primary system status of the primary system to the scheduled system maintenance status.

11. A computer-implemented system, comprising:
one or more processors; and
a non-transitory computer-readable storage medium coupled to the one or more processors and storing programming instructions for execution by the one or more processors, the programming instructions instructing the one or more processors to perform operations comprising:
  receiving, at a zero downtime system, a request for an application, the application accessible through: 1) one or more primary application servers on a primary system coupled to a primary database, and 2) one or more secondary application servers on a secondary system coupled to a secondary database synchronized to the primary database;
  determining, by the zero downtime system, a primary system status of the primary system;
  when the primary system status of the primary system is a healthy status, routing the request to the one or more primary application servers of the primary system;
  when the primary system status of the primary system is an unhealthy status:
    informing, by an application of a primary-secondary managing console, a request router that the primary system status of the primary system is the unhealthy status;
    triggering, by an application of the primary-secondary managing console operating as a load balancing console and in response to the informing, the request router to begin routing traffic to the secondary system; and
    routing, by the request router, the request to one or more secondary application servers of the secondary system;
  when the primary system status of the primary system is a scheduled system maintenance status:
    receiving, from the application of the primary-secondary managing console operating as the load balancing console, an instruction initiated by an administrator instructing the request router to begin routing traffic to the secondary system;
    routing the request to the one or more secondary application servers of the secondary system;
    performing the scheduled system maintenance of the primary system, including using secondary instances in addition to the secondary database, wherein the secondary instances are permanently connected to the secondary database;
    upon completion of the scheduled system maintenance of the primary system:
      synchronizing, by a secondary database managing console, the secondary database, the primary database, and the secondary instances; and
      setting, by the primary-secondary managing console, the primary system status of the primary system to the healthy status; and
  handling the request by the one or more primary application servers or the one or more secondary application servers, depending on the routing.

12. The computer-implemented system of claim 11, wherein routing the request to the one or more primary application servers of the primary system or the one or more secondary application servers of the secondary system includes routing the request, by the request router, to one of the primary system or the secondary system based on a current status.

13. The computer-implemented system of claim 12, wherein determining the primary system status of the primary system comprises:
  determining, by a primary-secondary managing console of the zero downtime system, that the primary system status of the primary system is in the unhealthy status when failures are detected on the primary system; and
  providing, by the primary-secondary managing console, a command to the request router indicating that the primary system status of the primary system is in the unhealthy status.

14. The computer-implemented system of claim 13, wherein the failures include one of data corruption on the primary system or a hardware failure on the primary system.

15. The computer-implemented system of claim 13, the operations further comprising:
  receiving, at the request router from the primary-secondary managing console, a command identifying a system maintenance time period for scheduled system maintenance of the primary system; and
  setting, by the primary-secondary managing console at a starting time of the system maintenance time period, the primary system status of the primary system to the scheduled system maintenance status.

* * * * *